United States Patent [19]

Hansson et al.

[11] Patent Number: 5,703,334

[45] Date of Patent: Dec. 30, 1997

[54] LOAD MEASURING DEVICE WITH A LOAD CELL AND METHOD FOR INTRODUCING A LOAD INTO THE LOAD CELL

[75] Inventors: Thomas W. Hansson, Natick; Randall K. Hopkins, Mendon, both of Mass.

[73] Assignee: HBM, Inc., Marlboro, Mass.

[21] Appl. No.: 612,677

[22] Filed: Mar. 8, 1996

[51] Int. Cl.$^6$ .................... G01G 1/00; G01G 3/00
[52] U.S. Cl. .................. 177/201; 177/184; 177/254; 177/255; 177/260; 177/DIG. 9; 384/99; 384/247
[58] Field of Search .................. 384/99, 247; 177/201, 177/203, 207, 208, 209, 254, 255, 260, 261, DIG. 9, 184, 187, 189, 141, 146

[56] References Cited

U.S. PATENT DOCUMENTS

| | | | |
|---|---|---|---|
| 2,488,348 | 11/1949 | Ruge | 177/210 |
| 2,775,887 | 1/1957 | Hines | 177/211 |
| 3,398,996 | 8/1968 | Wucherer | 384/99 |
| 4,137,977 | 2/1979 | Alger | 177/146 |
| 4,411,327 | 10/1983 | Lockery et al. | 177/211 |
| 4,489,797 | 12/1984 | Gordon | 177/187 X |
| 4,657,411 | 4/1987 | Bath | 384/99 |
| 4,673,048 | 6/1987 | Curran | 177/146 |
| 4,716,979 | 1/1988 | Bradley et al. | 177/208 |
| 4,804,053 | 2/1989 | Nordstrom | 177/211 |
| 5,111,702 | 5/1992 | Antkowiak | 73/862.65 |

Primary Examiner—Michael L. Gellner
Assistant Examiner—Randy W. Gibson
Attorney, Agent, or Firm—W. G. Fasse; W. F. Fasse

[57] ABSTRACT

A load to be measured is transmitted to a load cell, such as a compression load cell, through a double piston, single cylinder load transmitter that has a pressure chamber between two pistons in the single cylinder. One piston bears against the load. The other piston bears against the load cell to form a floating link between the load and the load cell when a sufficient pressure is introduced into said pressure chamber to prevent unwanted, off-center load application force components from adversely affecting any measured results. Preferably, at least one axially outwardly facing end surface of the piston bearing against the load cell has a curved end surface area. A rocker pin with a pressure controllable variable length may be formed by making both axially outwardly facing end surfaces curved. Several load transmitters may be arranged in parallel to transmit larger loads into a load cell.

26 Claims, 4 Drawing Sheets

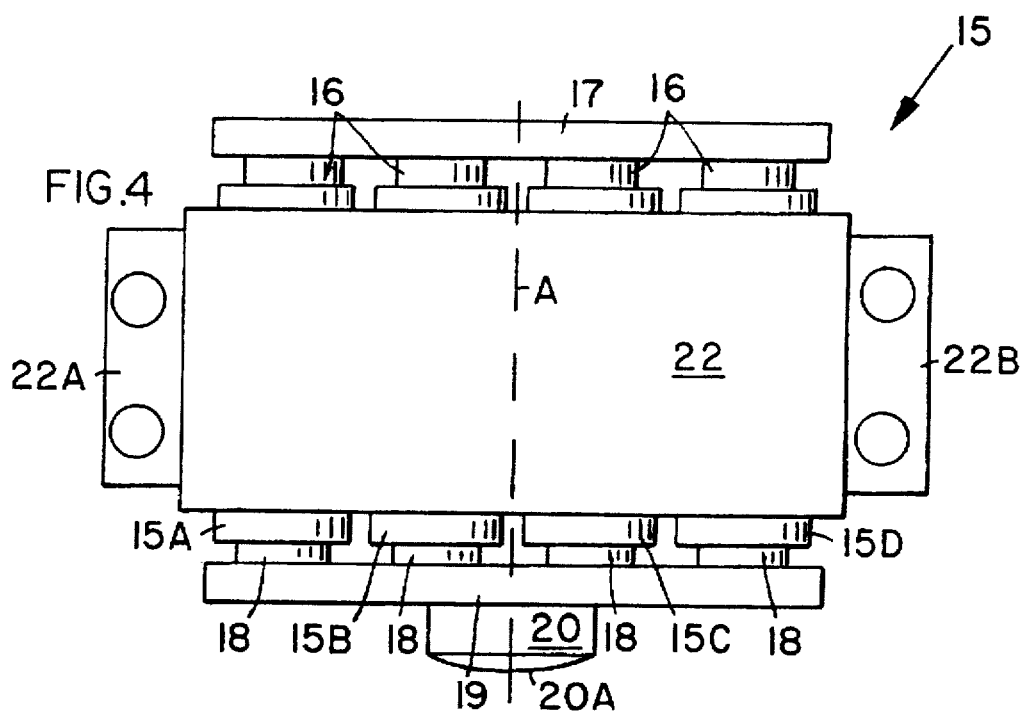
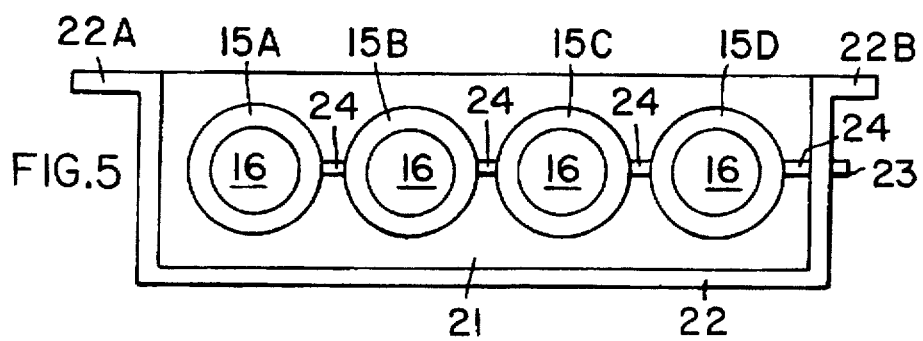
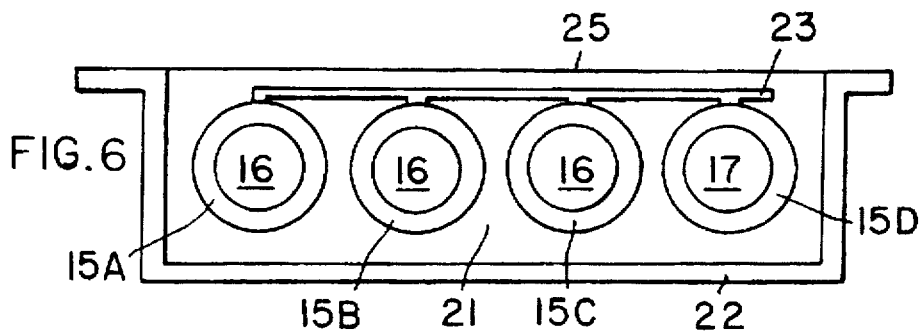

LOAD MEASURING DEVICE WITH A LOAD CELL AND METHOD FOR INTRODUCING A LOAD INTO THE LOAD CELL

FIELD OF THE INVENTION

The invention relates to measuring loads with load cells, such as compression load cells or bending beam load cells, for example in a weighing scale. More specifically, the invention relates to introducing the load into a load cell through a load transmitter that reduces or eliminates off-center load application effects.

BACKGROUND INFORMATION

Introducing a load into a load cell such as a torsion ring load cell, a compression load cell, a bending beam load cell or the like requires that effects of any off-center load application are preferably avoided or at least optimally reduced. Conventional efforts to eliminate or minimize off-center load application effects have been made either directly in the load cell or in the elements that transmit the load to the load cell. Efforts made heretofore to achieve this goal leave room for improvement.

U.S. Pat. No. 5,111,702 (Antkowiak), issued on May 12, 1992, relating to a compression load cell of the torsion ring transducer type discloses a transducer construction which itself minimizes off-center load application effects.

U.S. Pat. No. 4,804,053 (Nordstrom), issued on Feb. 14, 1989, tries to eliminate the problem of side loading or so-called off-center load application by constructing the load cell itself as a rocker pin load cell. Additionally, rocker pins of various sizes are well known in the art for introducing a load into a load cell.

U.S. Pat. No. 2,488,348 (Ruge), issued on Nov. 15, 1949, improves the avoidance of off-center load application effects by providing a special adapter member with a seat for the load introduction having a spherical segment configuration. This structure shall transmit the load freely and accurately in an axial direction regardless of any eccentricity or angularity of the load application direction.

U.S. Pat. No. 2,775,887 (Hines), issued on Jan. 1, 1957, discloses a load cell for a dynamometer with an overload protection in which the load cell proper is connected to a cylindrical rod received with a press fit in an annular sleeve which is held by flexible membranes to permit compensation for off-center load applications.

OBJECTS OF THE INVENTION

In view of the above it is the aim of the invention to achieve the following objects singly or in combination:

- to construct a load measuring device so that effects of off-center load applications are optimally reduced or even eliminated with the help of a new load transmitter;
- to provide a homogeneous floating link between a load and a load cell through a single cylinder double piston device forming said new load transmitter;
- to construct a floating single cylinder double piston device as a load transmitter that will be free or substantially free of vertical shunting forces representing off-center load application effects or force components;
- to construct a single cylinder double piston device as a rocker pin to function as a load transmitter between a load and a load cell;
- to construct a single cylinder double piston device as a rocker-pin load transmitter with a variable pin length;
- to construct a load transmitter so that it is compatible with different types of load cells such as compression load cells, torsion ring load cells, bending beam load cells and the like; and
- to transmit even very large loads through a plurality of smaller load transmitters arranged in parallel to each other in a space that would be insufficient for a large load transmitter.

SUMMARY OF THE INVENTION

According to the invention there is provided a load measuring device which combines a load cell which has a load application surface, with a load transmitter for introducing a load to the load application surface. The load transmitter comprises at least one hollow cylinder having a longitudinal central cylinder axis and first and second pistons in the hollow cylinder to form a pressure chamber in the hollow cylinder between inner end surfaces of the first and second pistons. The cylinder wall is provided with a fluid inlet leading into the pressure chamber for introducing a fluid under pressure into the pressure chamber to force the first and second pistons axially in opposite directions so that their axially outwardly facing surfaces bear against a load and against the load application surface of the load cell, respectively. Preferably, at least one outer piston end surface has a curved surface configuration. More preferably, both axially outwardly facing surfaces of the first and second pistons each have a curved surface such as a spherically curved surface to form a rocker pin.

According to the invention there is further provided a method of using a load transmitter or a rocker pin of the invention. The present method is characterized in that first the load cell is provided with a load application surface which is preferably a flat surface. Then the above described load transmitter that may or may not have the form of a rocker pin, is inserted between the load application surface of the load cell and a surface of a load receiving member such as a weighing scale platform or the like. Next, a fluid under pressure is introduced into the pressure chamber between the two separate pistons for contacting the load and the load application surface with axially outer end surfaces of the two pistons.

The invention also relates to a rocker pin construction for introducing a load into a load cell, wherein the rocker pin comprises the hollow cylinder with two pistons facing each other to form a pressure chamber inside the cylinder. The pressure chamber is connectable through an inlet to a source of pressure such as hydraulic pressure or pneumatic pressure. Each piston has an axially outwardly facing surface with a respective curved surface area which preferably has a spherical curvature and the radii of these curvatures may either be the same for both piston end surface areas or they may differ from each other. The radii preferably have an origin located on a central, longitudinal axis of the hollow cylinder.

Advantages of the invention are seen that in one embodiment at least one cylinder is secured to a frame providing a mechanical fixed point. Welding or a "bolting" bracket may be used for this purpose to hold the hydraulic or pneumatic cylinder in a fixed position. The opposing pistons permit the force to be applied to one piston that reacts against the hydraulic fluid causing the other piston to bear against the load cell.

Instead of mounting the cylinder or cylinders in a fixed position, a flexible bushing such as a rubber bushing may be used to flexibly secure the cylinder to a fixed frame or the like to compensate for extraneous off-center loads acting on the upper piston. Such off-center loads can cause an intolerable friction in the movement of the load introduction device. Encasing the walls of the hydraulic cylinder with a device, rubber bushing, or other flexible device, will permit the entire cylinder to deflect with little or no resistance, thereby avoiding such friction.

BRIEF DESCRIPTION OF THE DRAWINGS

In order that the invention may be clearly understood, it will now be described, by way of example, with reference to the accompanying drawings, wherein:

FIG. 4 is an elevational side view of a modified load transmitter with a plurality of piston cylinder devices arranged in parallel to each other to form a group;

FIG. 5 is a top view of FIG. 4 wherein the group of piston cylinder devices is connected in series to a fluid pressure source; and FIG. 6 is a view similar to that of FIG. 5, but illustrating a parallel connection of all piston cylinder devices to the fluid pressure source.

DETAILED DESCRIPTION OF PREFERRED EXAMPLE EMBODIMENTS AND OF THE BEST MODE OF THE INVENTION

Figure 1:
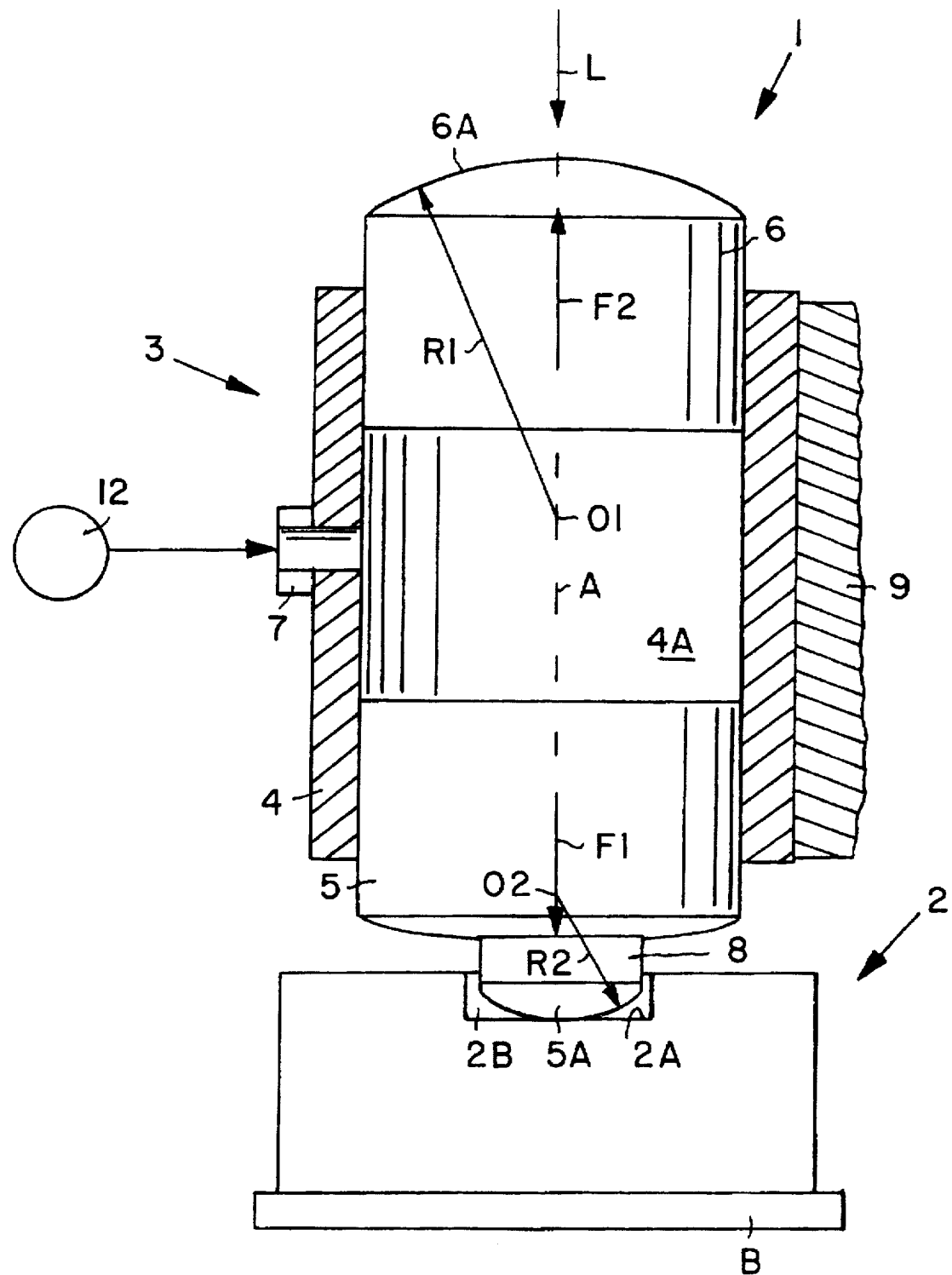
FIG. 1 is an elevational view of a first embodiment of a load measuring device according to the invention with a load cell and a rocker pin load transmitter shown partially in section.

FIG. 1 shows a load measuring device 1 according to the invention with a load cell 2 mounted on a base B and a load transmitter 3 positioned for transmitting a load L into the load cell 2 which is provided for this purpose with a load receiving surface 2A preferably formed as a bottom in a recess 2B. Two pistons 5 and 6 are arranged in axial alignment with each other and coaxially in a cylinder 4 relative to a central longitudinal axis A along which the load L is normally introduced. Any force components off-center to the axis A or angularly thereto cause off-center load effects that must be eliminated or at least optimally reduced for an accurate measurement of the load L.

The inwardly facing end surfaces of the two pistons 5 and 6 enclose a pressure chamber 4A inside the cylinder 4. The pressure chamber 4A is connected through a pressure inlet 7 to a source of fluid pressure 12 that is conventionally controllable in its output pressure. Preferably, the pressure source 12 is a hydraulic pump. However, pneumatic pressure may also be used.

The lower piston 5 has, for example, a piston rod 8 of reduced diameter compared to the diameter of the piston 5 and an axially outwardly facing surface of the piston rod 8 has a curved surface area 5A preferably of spherical curvature that contacts the load receiving surface 2A of the load cell 2.

The upper piston 6 preferably also has a curved surface area 6A that preferably has a spherical curvature. The piston 6 may also be provided with a piston rod not shown, but of the same type as illustrated at 8 for the piston 5. Axially facing end walls, not shown, of the cylinder 4 may extend around the piston rods with the required seals so as to prevent the pistons 5 and 6 from completely exiting from the cylinder 4. However, such construction may not be necessary where the load transmitter 3 is permanently installed between a load transmitting surface such as a downwardly facing surface of a scale platform and the load receiving surface 2A of the load cell 2. When the pressure source 12 is energized, force components F1 and F2 press the pistons 5 and 6 in the respective direction against the load cell and against the load to thereby provide a cushioned or floating load transmitter 3. The load transmitter 3 may form a rocker pin if both axially outwardly facing surfaces 5A and 6A of the pistons 5 and 6 respectively have the required curvatures, and if the cylinder 4 is not restrained against rocking movements. Under these conditions the rocker pin load transmitter may even have a variable axial length depending on the pressure generated by the pressure source 12. Preferably, origins 01 and 02 of the radii R1 and R2 of curvature of the end surfaces 5A and 6A facing axially outwardly, are positioned on the central axis A. These radii will preferably have the same length but may have different lengths as shown in FIG. 1. It is well known that a rocker pin becomes self-stabilizing if the sum of the radii R1 and R2 is larger than the effective length from tip-to-tip of the rocker pin.

Normally, where the self-stabilizing effect of a rocker pin is not critical, the present device will not be a rocker pin. The device will be installed by securing the cylinder 4 to a mounting bracket 9 that may be part of a foundation or part of the base B. The pistons 5, 6 will be made of hardened steel, especially the curved surface areas 5A and 6A will be made of hardened steel for contacting the load cell 2 and the load L respectively.

Figure 2:
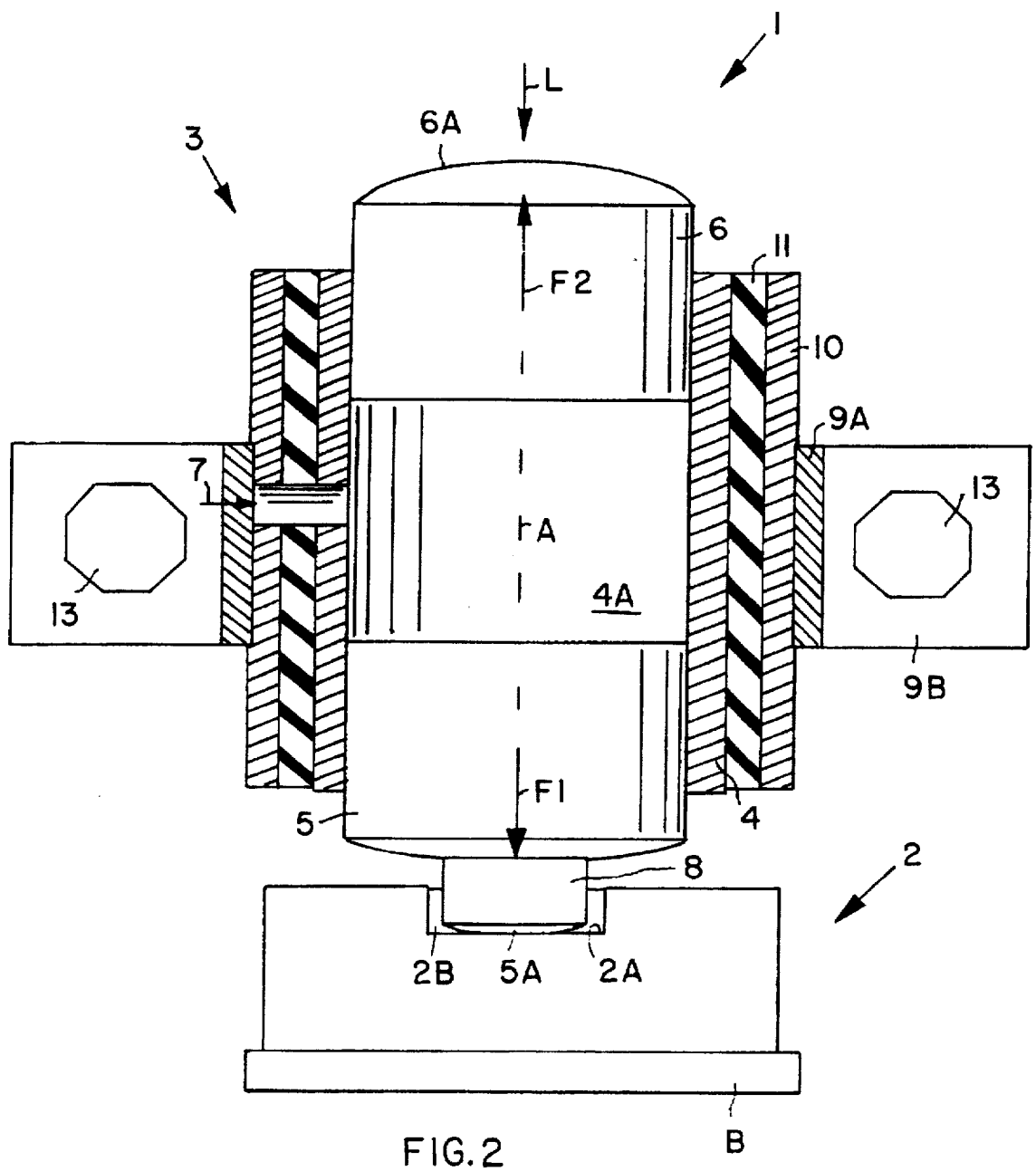
FIG. 2 is a view similar to that of FIG. 1, showing a modification in which a flexure device or member is inserted between a cylinder of the rocker pin load transmitter and an outer casing.

FIG. 2 illustrates an embodiment in which all components shown in FIG. 1 are provided with the same reference numbers. The additional components of FIG. 2 include an outer casing 10 connected to a mounting ring 9A which in turn is connected to mounting members 9B provided with holes 13 for securing the casing 10 to a foundation or the like. According to the invention, an elastic sleeve or bushing 11 of a suitable elastomeric material such as rubber is inserted between the cylinder 4 and the casing 10 for permitting the entire load transmitter 3 to freely float vertically, yet be restrained laterally when off-center load application force components are effective to cause lateral force components. For this purpose, the elastic, flexible sleeve or bushing 11 forms an insert which has a relatively small vertical stiffness, but a high lateral or radial stiffness. Rubber sleeves or metal reinforced rubber bushings may be used for this purpose.

Figure 3:
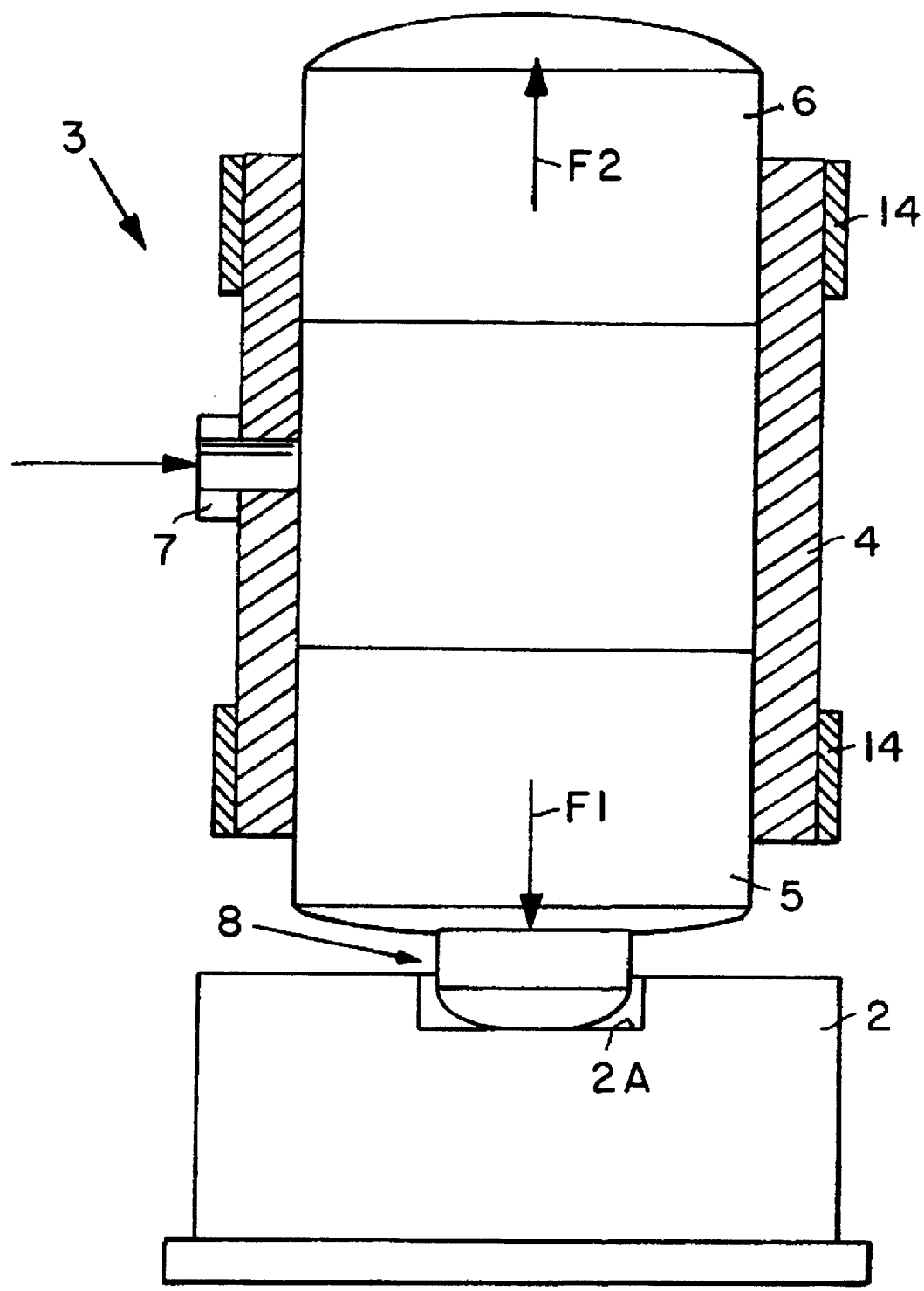
FIG. 3 is a view similar to FIG. 2, illustrating two mounting rings constructed as elastically yielding rings to permit deflections that may occur during operation.

The flexing sleeve or bushing 11 of FIG. 2 which has a high vertical shear strength, but a low lateral displacement, or rather a high lateral stiffness, can be replaced by a different system of flexing elements such as the flexible metal rings 14 in the embodiment of FIG. 3. These flexible metal rings 14 perform the same function as a mounting as the bushing 11 in FIG. 2.

In view of the above description, it will be appreciated that the load cell can be, for example a compression load cell, a torsion ring transducer, or a bending beam load cell, each provided with a respective load receiving or load application surface 2A.

Where the flexible insert 11 and/or the rigid mounting bracket 9 of the cylinder 4 is omitted, the force transmitter 3 will be able to function as a rocker pin which preferably is self-restoring if the above mentioned condition for self-stabilizing is satisfied. The axial length from tip-to-tip of the present rocker pins is readily adjustable by controlling the pressure of the pressure source 12.

Further, the flexible sleeve or bushing 11 may be made sufficiently flexible to permit a limited rocker pin action.

The present load transmitter is used by placing the transmitter between the load receiving surface 2A, preferably a flat surface of a load cell 2, and a load L and then introducing from the fluid pressure source 12 a pressurized fluid into the pressure chamber 4A between the two pistons 5, 6 in the single cylinder 4 for moving the two pistons axially away from each other to bear against the load and the load application surface with the axially outer end surfaces of the two pistons.

FIG. 4 illustrates in an elevational front view of another embodiment of the invention comprising a group 15 of, for example, four single cylinder double piston devices 15A, 15B, 15C and 15D forming load transmitters as described above. The upper piston rods 16 are rigidly secured to an upper load application plate 17. The downwardly extending piston rods 18 are also rigidly connected to a rigid load transmitting plate 19. The plates 17, 19, extend in parallel to each other. The load transmitting devices 15A, 15B, 15C and 15D are arranged substantially in parallel relative to each other and with their longitudinal axis perpendicularly to the plane of the two plates 17 and 18. The grouping is preferably such that the individual devices are arranged symmetrically relative to a central longitudinal axis A of the group 15. The axis A forms an axis of symmetry in common to all load transmitters of the respective group. The load transmitting plate 19 is provided with a projection 20 having a curved surface 20A that will contact the load receiving surface 2A of a load cell not shown in FIG. 4. The curved surface 20A has a radius of curvature with its origin on said common axis A of symmetry.

In FIG. 4 the individual load transmitters 15A, 15B, 15C and 15D are arranged in a row as best seen in FIG. 5. The row in turn is encased by an elastic packing such as rubber 21 held in a mounting bracket 22 provided with mounting flanges 22A and 22B for securing the entire unit to a frame or the like (not shown). The projection 20 will always be centrally positioned even if the individual piston cylinder devices are not positioned in a row. These transmitters could for example be arranged in a circle or in a square or the like. Thus, the longitudinal axis of the projection 20 will always coincide with the common axis of symmetry A.

In FIG. 5 the four piston cylinder devices are connected in series through a pressure inlet 23 to the fluid pressure source 12 shown in FIG. 1. Thus, the pressurization in the series connection of FIG. 5 will take place one after the other through the pressure lines 24.

In FIG. 6 the piston cylinder devices are connected in parallel through a fluid pressure supply line 25 which in turn is connected to the pressure inlet 23, whereby all pressure chambers in the transmitters will be pressurized substantially simultaneously.

The advantage of the embodiment shown in FIGS. 4, 5 and 6 is seen in that a plurality of relatively small load transmitters can take the place of a single large load transmitter for which sufficient space may not be available, yet a large load must be transmitted into a load cell. For example in a scale four groups 15 may be arranged in each corner of a scale platform. Further, the number of piston cylinder devices can be selected as required for the size of the load to be transmitted and measured. Thus, for example two, or three, or more load transmitters may be grouped together as taught herein.

Although the invention has been described with reference to specific example embodiments, it will be appreciated that it is intended to cover all modifications and equivalents within the scope of the appended claims.

What is claimed is:

1. A load measuring device comprising a load cell including a load application surface, at least one load transmitter positioned for introducing a load to said load application surface of said load cell, said at least one load transmitter comprising a hollow cylinder having a longitudinal central cylinder axis, a first piston in said hollow cylinder, a second piston in said hollow cylinder, a pressure chamber in said hollow cylinder between inner ends of said first and second pistons, a fluid inlet connected to said cylinder and leading into said pressure chamber for introducing a fluid under pressure into said pressure chamber to force said first and second pistons axially in opposite directions against said load application surface of said load cell and against a load respectively.

2. The device of claim 1, wherein at least one of said first and second pistons comprises an axially outwardly facing surface having a curved surface area for contacting one of said load and said load application surface.

3. The device of claim 1, wherein said first piston comprises a first axially outwardly facing surface having a curved first surface area, wherein said second piston comprises a second axially outwardly facing surface having a curved second surface area for forming a rocker pin load transmitter.

4. The device of claim 3, wherein said rocker pin is made of hardened steel.

5. The device of claim 3, wherein said load cell comprises a recess, said load application surface forming a bottom in said recess, said rocker pin reaching with its curved surface area into said recess for contacting said load application surface of said load cell.

6. The device of claim 1, wherein at least one of said first and second pistons comprises an axially outwardly extending piston section having a reduced diameter relative to said at least one piston, said piston section having an axially outwardly facing surface having a curved surface area.

7. The device of claim 1, further comprising a mounting bracket secured to said cylinder.

8. The device of claim 1, further comprising an outer casing secured to said cylinder for mounting said cylinder.

9. The device of claim 8, further comprising a flexible insert between said cylinder and said outer casing for keeping said cylinder free of undesirable force components that could falsify a measured load to reduce off-center load application and deflection effects.

10. The device of claim 9, wherein said flexible insert is a rubber sleeve or bushing having a high vertical shear strength and a low radial or lateral displacement.

11. The device of claim 1, wherein said load cell is one of a torsion ring transducer, a compression load cell, and a bending beam load cell.

12. The device of claim 1, wherein said cylinder is a hydraulic or pneumatic cylinder for providing a floating force transmitting link between a load and said load application surface of said load cell.

13. The device of claim 1, comprising a plurality of hollow cylinder load transmitters, each load transmitter including a hollow cylinder and first and second pistons in said hollow cylinder, and wherein said plurality of load transmitters are arranged substantially in parallel to each other.

14. The device of claim 13, further comprising a mounting bracket provided in common for said plurality of load transmitters forming a group.

15. The device of claim 14, further comprising a flexible insert between said plurality of load transmitters and said mounting bracket.

16. The device of claim 13, further comprising a fluid pressure supply inlet connected to said hollow cylinders.

17. The device of claim 16, further comprising a fluid pressure line connecting said hollow cylinders in parallel or in series to said fluid pressure supply inlet.

18. The device of claim 13, further comprising a load application plate secured in common to all of said first pistons and a load transmitting plate secured in common to said second pistons, said load transmitting plate comprising a projection having a curved surface for contacting said load application surface of said load cell.

19. The device of claim 18, wherein said load application plate and said load transmitting plate interconnect said plurality of load transmitters as a group having a common axis of symmetry.

20. The device of claim 19, wherein said projection has a longitudinal axis coinciding with said common axis of symmetry, and wherein said curved surface of said projection has a radius of curvature having its origin on said common axis of symmetry.

21. A method for introducing a load into a load cell, comprising the following steps:

(a) providing said load cell with a load application surface, (b) placing between said load and said load application surface, at least one single cylinder double piston load transmitter having a pressure chamber in said single cylinder between axially inner end surfaces of two pistons in said cylinder, and (c) introducing a pressurized fluid into said pressure chamber for moving said two pistons axially away from each other to bear against said load and said load application surface with axially outer end surfaces of said two pistons.

22. The method of claim 21, further comprising providing each axially outwardly facing end surface of said two pistons with a curved end surface area to form a rocker pin load transmitter.

23. The method of claim 22, further comprising varying the axial length of said rocker pin load transmitter by controlling a pressure of said pressurized fluid inside said load transmitter.

24. A rocker pin for introducing a load into a load cell, comprising a hollow cylinder having a central longitudinal axis, a first piston in said hollow cylinder, a second piston in said hollow cylinder, a pressure chamber between said first and second pistons in said hollow cylinder, an inlet for introducing a fluid under pressure into said pressure chamber, said first piston having an axially outwardly facing first surface with a curved first surface area, said second piston having an axially outwardly facing second surface with a curved second surface area thereby forming said rocker pin.

25. The rocker pin of claim 24, wherein said curved first and second surface areas have different radii or the same radius of curvature, said radius or radii having an origin on said central longitudinal axis.

26. The rocker pin of claim 24, further comprising at least one extension member having a smaller diameter than said first and second pistons, said extension member being secured to one of said first and second pistons in axial alignment therewith, said extension member having one of said curved first and second surface areas.

* * * * *